United States Patent
Grover

(10) Patent No.: US 11,695,989 B2
(45) Date of Patent: Jul. 4, 2023

(54) CONTENT-MODIFICATION SYSTEM WITH USER EXPERIENCE ANALYSIS FEATURE

(71) Applicant: Roku, Inc., San Jose, CA (US)

(72) Inventor: Matthew Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/358,537

(22) Filed: Jun. 25, 2021

(65) Prior Publication Data
US 2022/0256238 A1  Aug. 11, 2022

Related U.S. Application Data

(60) Provisional application No. 63/148,582, filed on Feb. 11, 2021.

(51) Int. Cl.
*H04N 21/442* (2011.01)
*H04N 21/462* (2011.01)

(52) U.S. Cl.
CPC ..... *H04N 21/44204* (2013.01); *H04N 21/462* (2013.01)

(58) Field of Classification Search
CPC .......... H04N 21/44204; H04N 21/462; H04N 21/25808; H04N 21/25833; H04N 21/25858; H04N 21/2668; H04N 21/44016; H04N 21/6543; H04N 21/812
See application file for complete search history.

(56) References Cited

U.S. PATENT DOCUMENTS

| | | | |
|---|---|---|---|
| 10,733,261 B1* | 8/2020 | Vukich | G06V 10/443 |
| 2003/0154479 A1* | 8/2003 | Brenner | H04N 21/84 348/E7.071 |
| 2005/0177847 A1* | 8/2005 | Konig | H04N 21/2143 725/38 |
| 2013/0091208 A1* | 4/2013 | Rajakarunanayake | H04L 67/306 709/204 |
| 2015/0113547 A1* | 4/2015 | Wolf | H04N 21/2393 725/9 |

* cited by examiner

*Primary Examiner* — Adil Ocak
(74) *Attorney, Agent, or Firm* — Sterne, Kessler, Goldstein & Fox P.L.L.C.

(57) ABSTRACT

In one aspect, a method includes determining a content-modification operation channel-change rate for a group of content-presentation devices having a common content-presentation device attribute; comparing the content-modification operation channel-change rate with a baseline channel-change rate; determining that a result of the comparing satisfies a threshold condition; and based on determining that the result of the comparing satisfies the threshold condition, preventing at least one content-presentation device of the group of content-presentation devices from carrying out a future content-modification operation.

20 Claims, 12 Drawing Sheets

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | | |
|---|---|---|---|---|---|---|
| T9 | T10 | T11 | T12 | T13 | T14 | |
| Compare first fingerprint data and second fingerprint data | Detect a match between first fingerprint data and second fingerprint data | Identify the channel on which the second content is being received | Generate metadata associated with the identified channel | Transmit an indication of the identified channel and the associated metadata | | |
| | | | | | Receive the indication of the identified channel and the associated metadata | |

Figure 4B

| | | | | | | | | | |
|---|---|---|---|---|---|---|---|---|---|
| T15 | | | | Determine historical content consumption data | | | | | |
| T16 | Transmit third content | | | | | | | | |
| T17 | Generate third fingerprint data and third metadata | | | | | | | | |
| T18 | Transmit third fingerprint data and third metadata | | | | | | | | |
| T19 | | | | | Receive modifiable content segment | | | | |
| T20 | | | | | Generate fourth fingerprint data and fourth metadata | | | | |
| T21 | | | | | Transmit fourth fingerprint data and fourth metadata | | | | |
| T22 | | | Receive third fingerprint data and third metadata | | | | | | |
| T23 | | | Receive fourth fingerprint data and fourth metadata | | | | | | |

Figure 4C

| | | | | | | | |
|---|---|---|---|---|---|---|---|
| T24 | Compare at least a portion of third fingerprint data and at least a portion of fourth fingerprint data | | | | | | |
| T25 | Detect a match between at least a portion of third fingerprint data and at least a portion of fourth fingerprint data | | | | | | |
| T26 | Identify an upcoming content modification opportunity on the identified channel | | | | | | |
| T27 | Transmit the third fingerprint data and the third metadata | | | | | | |
| T28 | | Receive third fingerprint data and third metadata | | | | | |
| T29 | | Receive fifth content | | | | | |
| T30 | | Output for presentation fifth content | | | | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | | Receive request and select supplemental content | | |
| T37 | | | | | Transmit request for link | | |
| T38 | | | | | | | Transmit link |

Figure 4E

|  |  | Transmit link |  |  |
|---|---|---|---|---|
| T39 | | | | |
| T40 | Receive link and retrieve supplemental content | | | |
| T41 | Perform content modification operation | | | |

Figure 4F

CONTENT-MODIFICATION SYSTEM WITH USER EXPERIENCE ANALYSIS FEATURE

CROSS REFERENCE TO RELATED APPLICATIONS

This disclosure claims priority to U.S. Provisional Patent App. No. 63/148,582, filed on Feb. 11, 2021, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

BACKGROUND

In various scenarios, a content distribution system can transmit content to one or more content-presentation devices, which can receive and output the content for presentation to an end-user. Further, such a content distribution system can transmit content in various ways and in various forms. For instance, a content distribution system can transmit content in the form of an analog or digital broadcast stream representing the content.

To perform these functions and various other functions, content-presentation devices and other devices within the content distribution system can be controlled by computer software that is executed on the devices. For example, a content-presentation device can include software that provides an operating system for the content-presentation device and firmware that provides control of hardware of the content-presentation device.

SUMMARY

In one aspect, an example method is disclosed. The method includes (i) determining, by a computing system, a content-modification operation channel-change rate for a group of content-presentation devices having a common content-presentation device attribute, with the content-modification operation channel-change rate including a rate at which content-presentation devices of the group of content-presentation devices change channels during content-modification operations; (ii) comparing, by the computing system, the content-modification operation channel-change rate with a baseline channel-change rate; (iii) determining, by the computing system, that a result of the comparing satisfies a threshold condition; and (iv) based on determining that the result of the comparing satisfies the threshold condition, preventing, by the computing system, at least one content-presentation device of the group of content-presentation devices from carrying out a future content-modification operation.

In another aspect, an example non-transitory computer-readable storage medium is disclosed. The non-transitory computer-readable medium has stored thereon program instructions that, upon execution by a processor, cause performance of a set of operations. The set of operations includes (i) determining a content-modification operation channel-change rate for a group of content-presentation devices having a common content-presentation device attribute, with the content-modification operation channel-change rate including a rate at which content-presentation devices of the group of content-presentation devices change channels during content-modification operations; (ii) comparing the content-modification operation channel-change rate with a baseline channel-change rate; (iii) determining that a result of the comparing satisfies a threshold condition; and (iv) based on determining that the result of the comparing satisfies the threshold condition, preventing at least one content-presentation device of the group of content-presentation devices from carrying out a future content-modification operation.

In another aspect, an example computing system is disclosed. The computing system includes a processor and a non-transitory computer-readable storage medium having stored thereon program instructions that, upon execution by the processor, cause performance of a set of operations. The set of operations includes (i) determining a content-modification operation channel-change rate for a group of content-presentation devices having a common content-presentation device attribute, with the content-modification operation channel-change rate including a rate at which content-presentation devices of the group of content-presentation devices change channels during content-modification operations; (ii) comparing the content-modification operation channel-change rate with a baseline channel-change rate; (iii) determining that a result of the comparing satisfies a threshold condition; and (iv) based on determining that the result of the comparing satisfies the threshold condition, preventing at least one content-presentation device of the group of content-presentation devices from carrying out a future content-modification operation.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
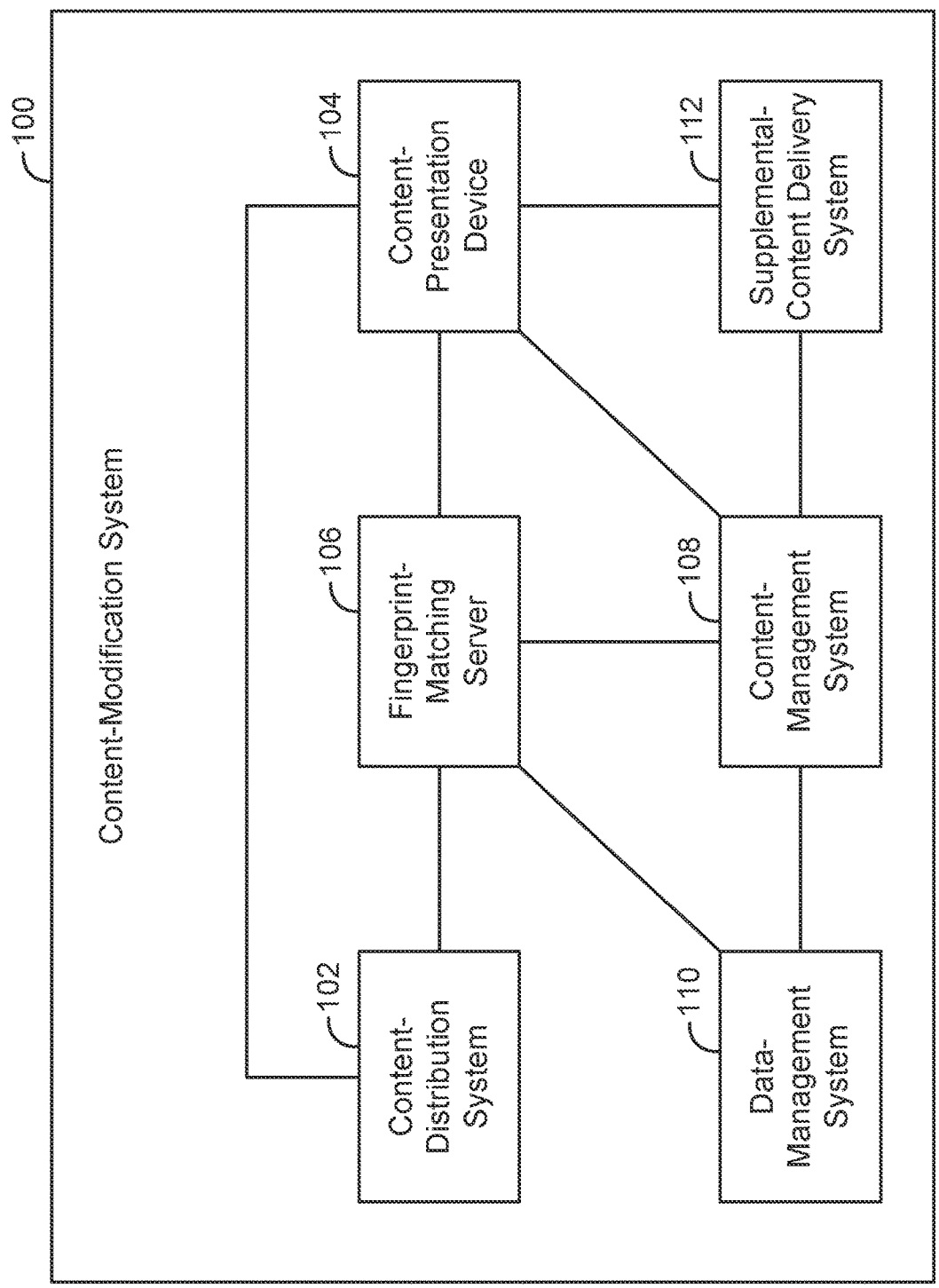
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In one example, the content-modification system can include a fingerprint-matching server that can identify an upcoming content-modification opportunity on an identified channel, which it can do by comparing and detecting a match between two different instances of fingerprint data. Based on the detected match, the fingerprint-matching server can then transmit fingerprint data and metadata to the content-presentation device to facilitate preparing the content-presentation device to perform a content-modification operation in connection with the identified upcoming content-modification opportunity.

However, in other cases, it may be desirable for the content-presentation device to use one or more alternative techniques to facilitate performing a content-modification operation.

For example, the fingerprint-matching server can use broadcast-schedule data to facilitate the content-presentation device performing a content-modification operation. Among other things, this can allow the content-presentation device to facilitate performing a content-modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

Content-presentation devices manufactured by different manufacturers can include different computer software and/or different versions of computer software. Further, different models of content-presentation devices manufactured by the same manufacturer can have different computer software and/or different versions of computer software. And in some cases, two content-presentation devices that are the same model might be executing different software versions.

In addition, content-presentation devices can be set up in many different manners. For instance, some content-presentation devices might receive content from one of multiple different models of set-top boxes. As another example, some content-presentation devices might output audio using one of multiple different models of external audio systems (e.g., an audio/video receiver and a set of external speakers).

These configurations of content-presentation devices can be described as content-presentation device setups. For example, a content-presentation device setup can include the model number of a setup-box that provides content to the content-presentation device or a model number of an audio/video receiver that the content-presentation device uses to output audio, Due to the difficulty of attempting to interface with many different types of content-presentation devices, software versions, and content-presentation device setups, there may be some combinations of content-presentation devices, software, and content-presentation device setups that lead to end-users having poor experiences during content-modification operations. Examples of poor user experiences include alternative content being output at an incorrect volume or alternative content not being output correctly visually on a content-presentation device.

In addition, due to the massive number of combinations of content-presentation devices, software versions, and content-presentation device setups, it can be cumbersome for an operator of a content-modification system to test the performance of content-modification operations in all of the combinations. As such, it is difficult to determine which combinations of content-presentation devices, software versions, and content-presentation device setups are prone to poor content-modification experiences and to remedy such issues.

Disclosed herein are methods and systems for detecting a group of content-presentation devices that are prone to having poor experiences during content-modification operations and taking corrective action. In an example method, a computing system can determine a content-modification operation channel-change rate for a group of content-presentation devices having a common content-presentation device attribute. The content-modification operation channel-change rate includes a rate at which content-presentation devices of the group of content-presentation devices change channels during content-modification operations. The computing system can then compare the content-modification operation channel-change rate with a baseline channel-change rate. Further, the computing system can determine that a result of the comparing satisfies a threshold condition. And based on determining that the result of the comparing satisfies the threshold condition, the computing system can prevent at least one content-presentation device of the group of content-presentation devices from carrying out a future content-modification operation.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
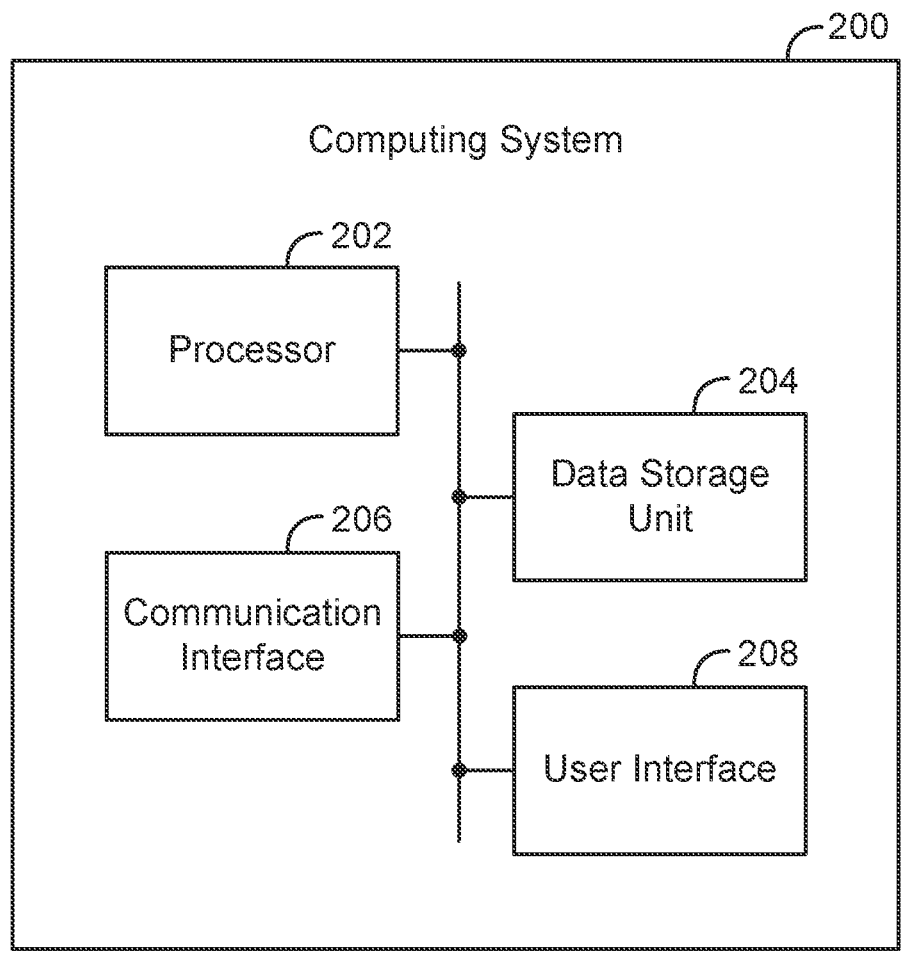
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

Figure 3:
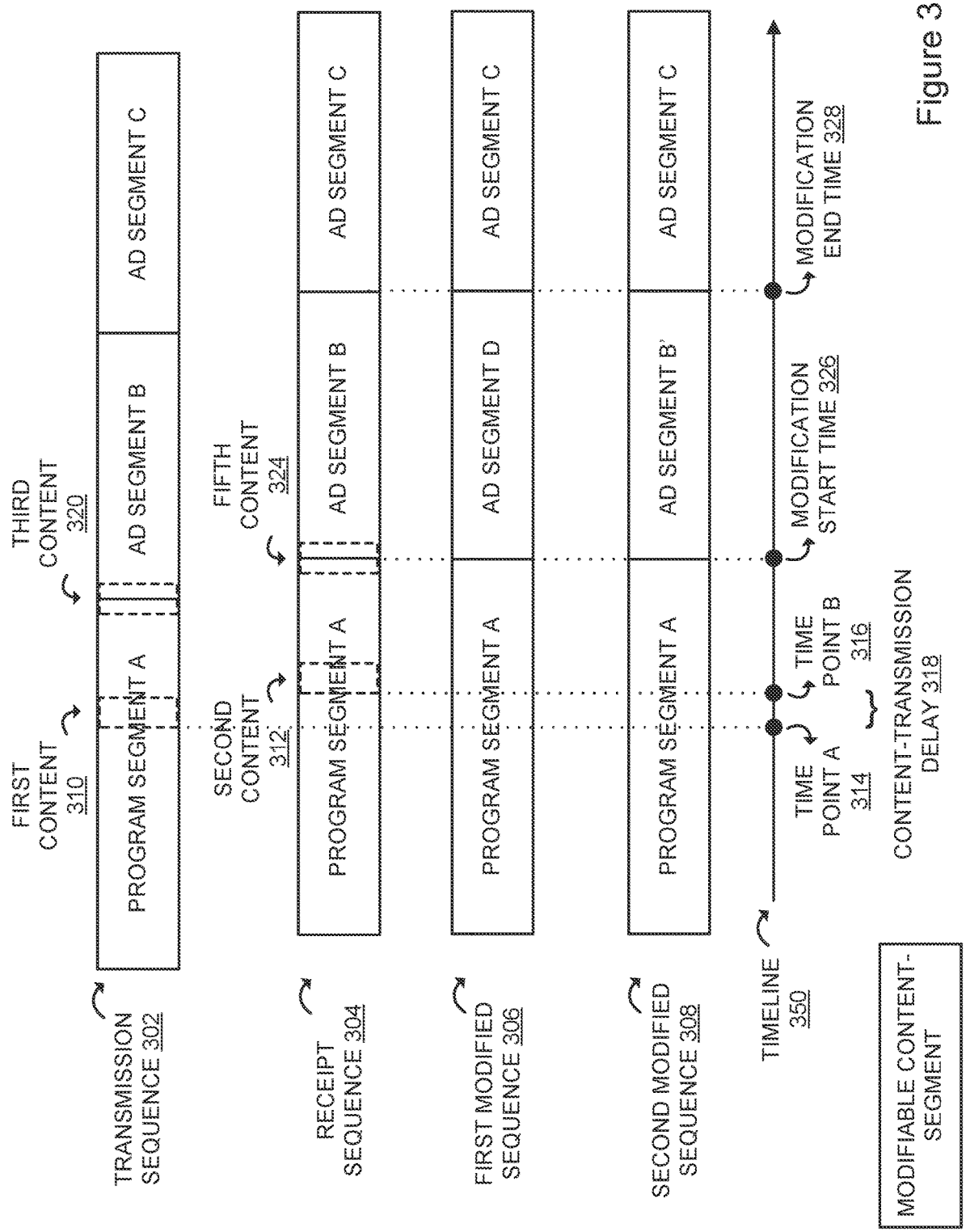
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint generation.

The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. By way of example, responsive to determining that a fingerprint of the second fingerprint data matches multiple fingerprints of the first fingerprint data, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content-modification opportunity on the identified channel. For example, the fingerprint-matching server 106 can determine that at least a beginning portion of the MODIFIABLE CONTENT-SEGMENT is included within the THIRD CONTENT 320, as shown in FIG. 3, and therefore can identify an upcoming content-modification opportunity.

As noted above, the fingerprint-matching server 106 can receive third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 to facilitate preparing the content-presentation device 104 to perform a content-modification operation in connection with the identified upcoming content-modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B with at least a portion of a different advertisement segment that is perhaps more targeted to the end-user. As another example, it can be desirable for the content-presentation device 104 to overlay on at least a portion of the AD SEGMENT B, overlay content that enhances at least a portion of the AD SEGMENT B in a way that is again perhaps more targeted to the end-user.

During a time-period T31, the content-presentation device 104 can generate fingerprint data representing the fifth content. This fingerprint data is referred to herein as "fifth fingerprint data." The content-presentation device 104 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the fifth fingerprint data, and/or the fifth metadata, on the other hand. The content-presentation device 104 can establish the synchronous lock using any synchronous lock technique now known or later developed. By way of example, the fingerprint-matching server 106 can transmit, to the content-presentation device 104, at least a portion of the third fingerprint data, and the content-presentation device 104 can increase the frame rate at which the content-presentation device 104 generates the fifth fingerprint data. The content-presentation device 104 can then use the third and fifth fingerprint data—namely, the time-stamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. As another example, the fingerprint-matching server 106 can establish synchronous lock as described above and then inform the content-presentation device 104.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content-modification operation (e.g., a replacement or overlay action, as described above) while tuned to the channel on which the RECEIPT SEQUENCE 304 is received, unless an intervening event occurs that might cause the content-modification operation (or the output of the resulting content) to be stopped, such as a channel change or a powering down of the content-presentation device 104 and/or associated display device. Thus, the FIRST MODIFIED SEQUENCE 306 or the SECOND MODIFIED SEQUENCE 308 can be output on the same channel on which the content-presentation device 104 is tuned—that is, the channel on which the modifiable content-segment is received and on which the content-modification opportunity was identified.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content-modification opportunity on the identified channel has been identified, (iv) that supplemental content has been requested, (v) that supplemental content has been received, (vi) that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

N. Operations Related to User Experience Analysis

In line with the discussion above, there may be certain combinations of content-presentation devices, software, and/or content-presentation device setups that lead to end-users having poor experiences during content-modification operations. Examples of poor user experiences include alternative content being output at an incorrect volume or alternative content not being output correctly visually on a content-presentation device. The root cause of a poor user experience could be a software error. For instance, an operating system or the firmware of a content-presentation device might include an error, flaw, fault, or unexpected operating behavior that causes the content-presentation device to produce an incorrect or unexpected result, or to behave in unintended ways during a content-modification operation.

If an end-user is having a poor experience during a content-modification operation, the end-user is likely to take corrective action to remedy the poor experience, such as changing channels. In accordance with the present disclosure, the content-modification system can identify a group of content-presentation devices that are having poor experiences during content-modification operations by determining and analyzing the content-modification operation channel-change rate of the group of content-presentation devices. After identifying such a group of content-presentation devices, the content-modification system can then prevent at least one content-presentation device of the group of content-presentation devices from carrying out a future content-modification operation. In this manner, the content-modification system can avoid causing another poor experience for an end-user of the content-presentation device until the cause of the poor experience has been resolved.

In some examples, a content-modification system can use data associated with a content-presentation device to determine a rate at which the content-presentation device changes channels during content-modification operations. For instance, the content-modification system can use the historical content consumption data and/or the tracking and reporting operation-related data noted above to determine the rate at which a content-presentation device changes channels during content-modification operations.

Similarly, the content-modification system 100 can determine content-modification operation channel-change rates for a plurality of other content-presentation devices. Further, the content-modification system can aggregate (e.g., average) rates for similar content-presentation devices having a common content-presentation device attribute, so as to determine a content-modification operation channel-change rate for a group of content-presentation devices. The common presentation-device attribute can include a combination of model number and software version, or a combination of model number, software version, and content-presentation device setup. Further, the content-modification system can compare a content-modification operation channel-change rate for a group of content-presentation devices having a common content-presentation device attribute with a baseline channel-change rate, and determine whether a result of the comparing satisfies a threshold condition. Based on determining that the result of the comparing satisfies the threshold condition, the content-modification system can take preventive action to help avoid future poor experiences for end-users of content-presentation devices of the group of content-presentation devices. For instance, the content-modification system can prevent content-presentation devices of the group of content-presentation devices from carrying out future content-modification operations, and report the common content-presentation device attribute to a testing module.

Figure 5:
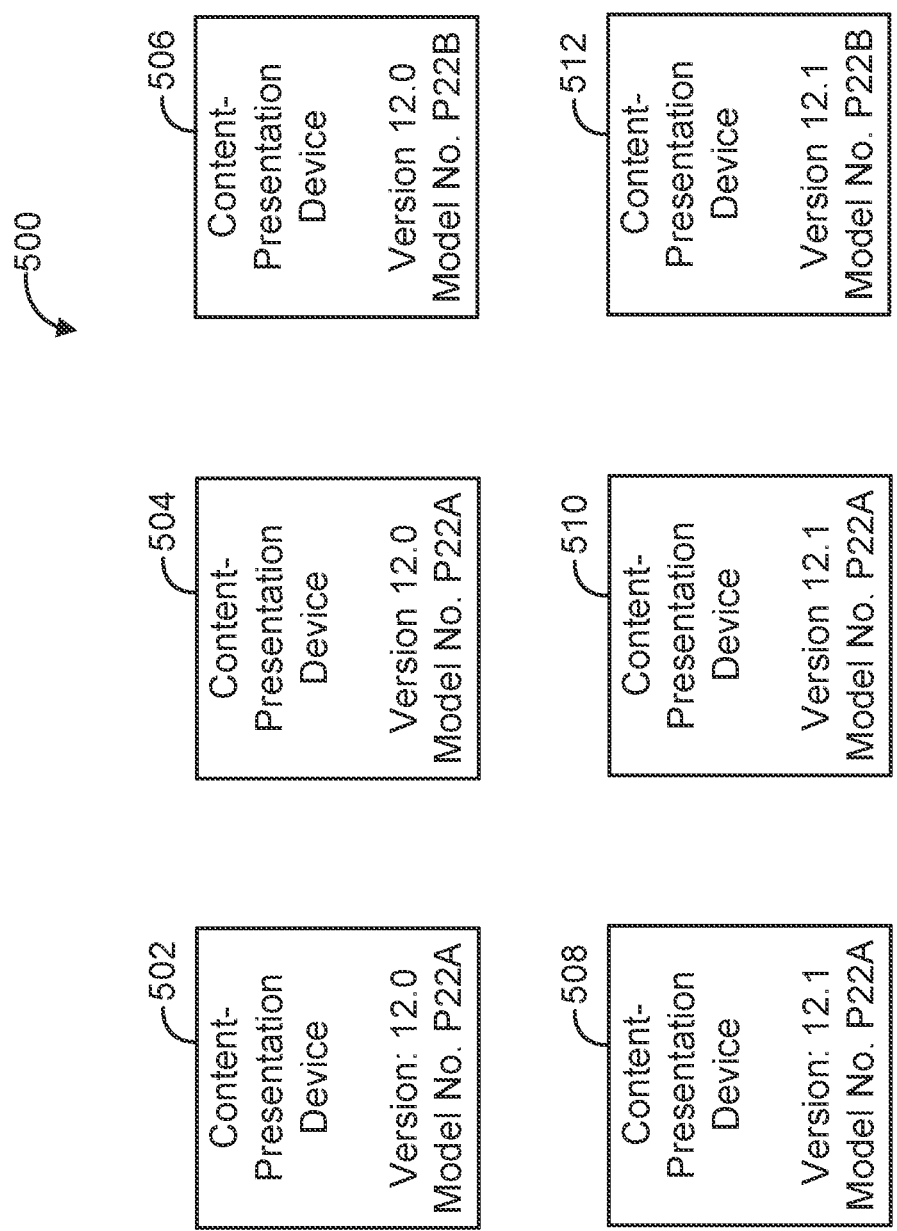
FIG. 5 illustrates a plurality of content-presentation devices.

FIG. 5 illustrates a plurality of content-presentation devices 500. As shown in FIG. 5, the plurality of content-presentation devices 500 include content-presentation devices 502, 504, 506, 508, 510, and 512. Each of the content-presentation devices can be connected to a content-distribution system.

Content-presentation devices of the plurality of content-presentation devices 500 have respective attributes. For instance, as shown in FIG. 5, content-presentation devices 502, 504, and 506 have a software version of 12.0, and content-presentation devices 508, 510, and 512 have a software version of 12.1 The software version can describe a version of an operation system or a version of firmware that provides control of hardware of the content-presentation device. Further, content-presentation devices 502, 504, 508, and 510 have a model number of P22A, whereas, content-presentation devices 506 and 512 have a model number of P22B.

As such, some of content-presentation devices 502, 504, 506, 508, 510, and/or 512 have one or more content-presentation device attributes in common. As one example, content-presentation devices 502, 504, and 506 have a common software version of 12.0. As another example, content-presentation devices 508 and 510 have a common combination of software version and model number, namely, software version of 12.1 and model number of P22A.

Figure 6:
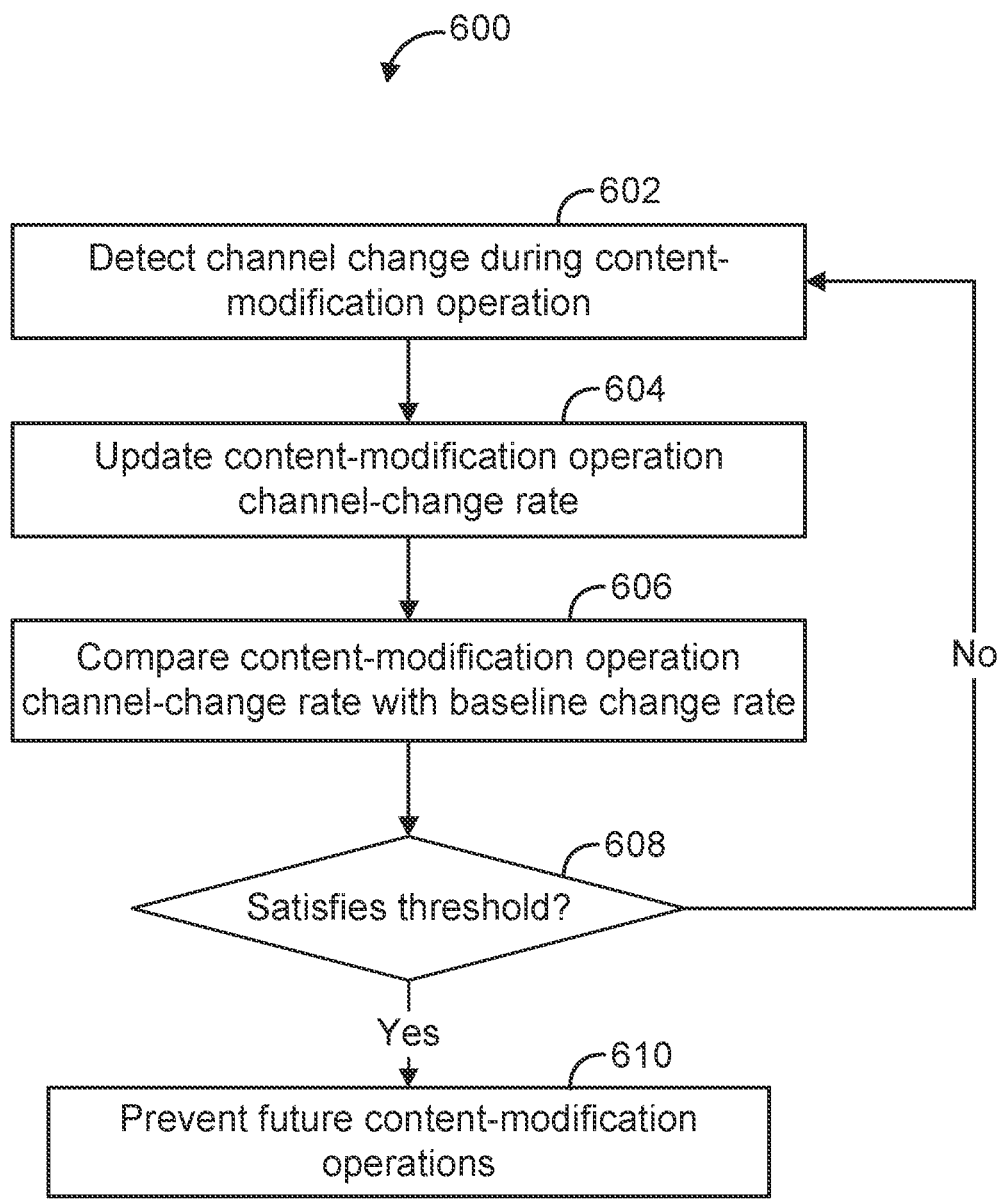
FIG. 6 illustrates an example process for detecting content-presentation devices associated with poor experiences during content-modification operations.

In line with the discussion above, a content-modification system can use attributes of content-presentation devices to identify a group of content-presentation devices that are prone to poor experiences during content-modification operations. FIG. 6 illustrates an example process 600 for detecting content-presentation devices associated with poor user-experiences during content-modification operations. Process 600 can be carried out by a content-modification system, such as content-modification system 100, or by one or more devices within a content-modification system.

At block 602, process 600 includes detecting a channel-change during a content-modification operation. The content-modification system can detect a channel change in various ways. As one example, in line with the discussion above, the fingerprint-matching server 106 can identify a first channel on which a content-presentation device is receiving content by matching fingerprint data received from the content-distribution system 102 with fingerprint data received from the content-presentation device. Subsequently, the fingerprint-matching server 106 can detect that the content-presentation device has tuned to a different channel by matching subsequent fingerprint data, which is received from the content-distribution system 102 and known to correspond to a content transmitted on a second channel, with subsequent fingerprint data received from the content-presentation device. As another example, the content-modification system 100 can receive a channel-change notification from the content-presentation device. For instance, the content-presentation device can be configured to transmit such a notification to the fingerprint-matching server 106 upon failing to match fingerprint data generated by the content-presentation device with fingerprint data received from the fingerprint-matching server 106.

At block 604, process 600 includes updating the content-modification operation channel-change rate for the content-presentation device. The content-modification operation rate may be associated with a group of content-presentation devices having a common content-presentation device attribute. For example, content-presentation devices 508, 510, and 512 can be a group of content-presentation devices having a common content-presentation device attribute of software version (i.e. a software version of 12.1 and content-presentation devices 502 and 504 can be a group of content-presentation devices having a common content-presentation device attribute of combination of software version and model number (i.e. a software version of 12.0 and a model number of P22A).

In one example, prior to detecting the channel change, the group of content-presentation devices can have a content-modification channel-change rate of eight out of twenty times, indicating that one or more end-users changed the channel eight times during twenty content-modification operations executed by the group of content-presentation devices. After detecting an additional channel change during the content-modification operation on any of the content-presentation devices of the group of content-presentation devices, the content-modification system can increment the content-modification channel-change rate associated with the group of content-presentation devices to be nine out of twenty-one times, or 43% percent.

At block 606, process 600 includes comparing the content-modification operation channel-change rate with a baseline rate. The baseline rate can vary depending on the desired implementation. In one example, the baseline rate can be a rate at which the content-presentation devices of the group of content-presentation devices change channels when the content-presentation devices output content that is not subject to content-modification operations. Specifically, perhaps content-presentation devices 508 and 510 change channels 10% of the time when the content-presentation devices output content that is not subject to content-modification operations. Thus, 10%, can be the baseline rate to which the content-modification operation channel-change rate is compared. Further, the content-modification channel-change rate and baseline rates can be specific to a same channel, daypart, and/or day of week, such that the rates are more readily comparable by eliminating possible irregularities caused by those particular characteristics. Additionally or alternatively, the baseline rate can be a rate at which the content-presentation devices of the group of content-presentation devices change channels while advertisements that are not part of a content-modification operation are presented.

Alternatively, the baseline channel change rate can be a content-modification operation channel-change rate for a global set of content-presentation devices that includes the group of content-presentation devices as well as other groups of content-presentation devices. For example, a group of content-presentation devices can be content-presentation devices 508 and 510 and a global set of content-presentation devices can include content-presentation devices 502, 504, 506, 508, 510, and 512.

Based on a result of the comparing, the content-modification system can predict whether or not the content-presentation devices of the group of content-presentation devices are having poor experiences during content-modification operations. For instance, the content-modification system can interpret a determination that the content-modification operation channel-change rate exceeds the baseline channel change rate by more than a threshold amount to mean that the content-presentation devices of the group of content-presentation devices are having poor experiences during content-modification operations. On the other hand, the content-modification system can interpret a determination that the content-modification operation channel-change rate does not exceed the baseline channel change rate by more than a threshold amount to mean that the content-presentation devices of the group of content-presentation devices are not having poor experiences during content-modification operations.

At block 608, the method includes determining whether the comparison between the content-modification operation channel-change rate and the baseline rate satisfies a threshold. In some cases, comparing the content-modification operation channel-change rate with the baseline rate could result in a determination that the content-modification channel-change rate exceeds the baseline rate by a threshold. For example, the content-modification channel-change rate could be 50%, the baseline rate could be 10%, and the threshold could be 15%. Since the content-modification channel-change rate of 50% exceeds the baseline rate of 10% by over 15%, the content-modification system can interpret the result of the comparing as satisfying the threshold.

Based on determining that the result of the comparison satisfies the threshold, at block 610, the content-modification system can prevent future content-modification operations for content-presentation devices of the group of content-presentation devices. The content-modification system can prevent future content-modification operations in one or more of a variety of ways, depending on the desired implementation. In some examples, the content-modification system can add the common content-presentation device attribute to a blacklist file. The inclusion of the common content-presentation device attribute in the blacklist file can cause the content-modification system 100 to prevent any content-presentation devices having the same common attribute from carrying out future content-modification operations. For example, if the group of content-presentation devices includes content-presentation devices 508 and 510 sharing common attribute of having a combination of a software version of 12.1 and a model number of P22A, then the combination of software version 12.1 and model number P22A can be added to the blacklist file. Accordingly, future content-modifications may be blocked on content-presentation devices having that same combination of a software version of 12.1 and a model number of P22A. Meanwhile, content-presentation devices 502, 504, 506, and 508, which do not have the combination of a software version of 12.1 and a model number of P22A, are still permitted to carry out future content-modification operations.

When a content-presentation device provides a request for supplemental content for use in carrying out a content-modification operation, the request can specify attributes of the content-presentation device or an identifier that can be used to retrieve attributes of the content-presentation device. The content-modification system can then cross-reference the attributes with attributes in the blacklist file to determine whether to respond to the request with supplemental content or to cause the content-presentation device to forgo carrying out the content-modification operation.

Alternatively, the content-modification system can compare attributes of content-presentation devices to the attributes in the blacklist file periodically (e.g., once a day, weekly, bi-weekly, etc.). Upon identifying a content-presentation device having a content-presentation device attribute specified in the blacklist file, the content-modification system can add an identifier of the content-presentation device to a list of content-presentation devices for which content-modification operations are temporarily prevented. With this approach, when a content-presentation device provides a request for supplemental content, the request can specify an identifier of the content-presentation device, and the content-modification system can then cross-reference the identifier with identifiers in the list of content-presentation devices to determine whether to respond to the request with supplemental content or to cause the content-presentation device to forgo carrying out the content-modification operation. Additionally or alternatively, upon identifying a content-presentation device having a content-presentation device having a content-presentation device attribute specified in the blacklist file, the content-modification system can transmit an instruction to the content-presentation device. Reception of the instruction can cause the content-presentation to temporarily forgo carrying out future content-modification operations.

In some examples, the content-modification system can report the common content-presentation device attribute to a testing module or other device so that the issue may be investigated. An operator can use the testing module to read the report and attempt to resolve the issue through recreating the issue in a controlled environment or through other issue resolution strategies. In some instances, after the issue has been resolved, the content-modification system might then allow content-modification operations on content-presentation devices having a common content-presentation device attribute associated with the resolved issue.

Alternatively, the analysis at block 608 could result in a determination that the content-modification channel-change rate does not exceed the baseline rate by a threshold rate. For example, the content-modification channel-change rate could be 50%, the baseline rate could be 40%, and the threshold could be 15%. Since the content-modification channel-change rate does not exceed the baseline rate by over 15%, the content-modification system can interpret the result of the comparing as not satisfying the threshold. Based on determining that the result does not satisfy the threshold, the content-modification system can then return to monitoring for events during future content-modification operations at block 602.

Although the examples above assume the corrective action of the end-user includes changing channels, the examples are not meant to be limiting. In some situations, if an end-user is having a poor experience during a content-modification operation, the end-user might adjust the volume of the content-presentation device during the content-modification operation. For instance, the user might increase or decrease the volume. Accordingly, the content-modification system can identify and determine a group of content-presentation devices that are having poor experiences during content-modification operations by determining and analyzing the content-modification operation volume-change rate of the group of content-presentation devices.

The content-modification system can use data associated with a content-presentation device to determine a rate at which the content-presentation device adjusts volume during content-modification operations. For instance, in some examples, the tracking and reporting operation-related data can include data indicating whether, and optionally to what degree, an end-user adjusted volume during a content-modification operation. Further, the content-modification system can aggregate (e.g., average) rates for similar content-presentation devices having a common content-presentation device attribute, so as to determine a content-modification operation volume-change rate for a group of content-presentation devices.

Still further, the content-modification system can compare the content-modification operation volume-change rate for the group of content-presentation devices with a baseline volume change rate to determine whether the content-modification operation volume-change rate is abnormally high. For instance, the baseline volume change rate can be a content-modification operation volume-change rate for a global set of content-presentation devices that includes the group of content-presentation devices as well as other groups of content-presentation devices.

Based on a result of the comparing, the content-modification system can predict whether or not the content-presentation devices of the group of content-presentation devices are having poor experiences during content-modification operations. Further, based on determining that the content-presentation devices of the group of content-presentation devices are having poor experiences during content-modification operations, the content-modification system can then take action to remedy this issue.

Similarly, in some situations, if an end-user is having a poor experience during a content-modification operation, the end-user might access a user-interface menu of the content-presentation device during the content-modification operation. Accordingly, the content-modification system can identify and determine a group of content-presentation devices that are having poor experiences during content-modification operations by determining and analyzing the content-modification operation menu-access rate of the group of content-presentation devices.

The content-modification system can use data associated with a content-presentation device to determine a rate at which the content-presentation device accesses a user interface menu during content-modification operations. For instance, in some examples, the tracking and reporting operation-related data can include data indicating whether an end-user accessed a user-interface menu during a content-modification operation. Such data can be determined using fingerprint matching. For instance, the fingerprinting-matching server 106 can compare fingerprint data generated by the content-presentation device to fingerprint data that is known to correspond to user interface menus to determine whether the content-presentation device is presenting a user interface menu. Further, the content-modification system can aggregate (e.g., average) rates for similar content-presentation devices having a common content-presentation device attribute, so as to determine a content-modification operation menu access rate for a group of content-presentation devices.

Still further, the content-modification system can compare the content-modification operation menu-access rate for the group of content-presentation devices with a baseline menu access rate to determine whether the content-modification operation menu-access rate is abnormally high. For instance, the baseline menu-access rate can be a content-modification operation menu-access rate for a global set of content-presentation devices that includes the group of content-presentation devices as well as other groups of content-presentation devices.

Based on a result of the comparing, the content-modification system can predict whether or not the content-presentation devices of the group of content-presentation devices are having poor experiences during content-modification operations. Further, based on determining that the content-presentation devices of the group of content-presentation devices are having poor experiences during content-modification operations, the content-modification system can then take action to remedy this issue.

O. Example Method

Figure 7:
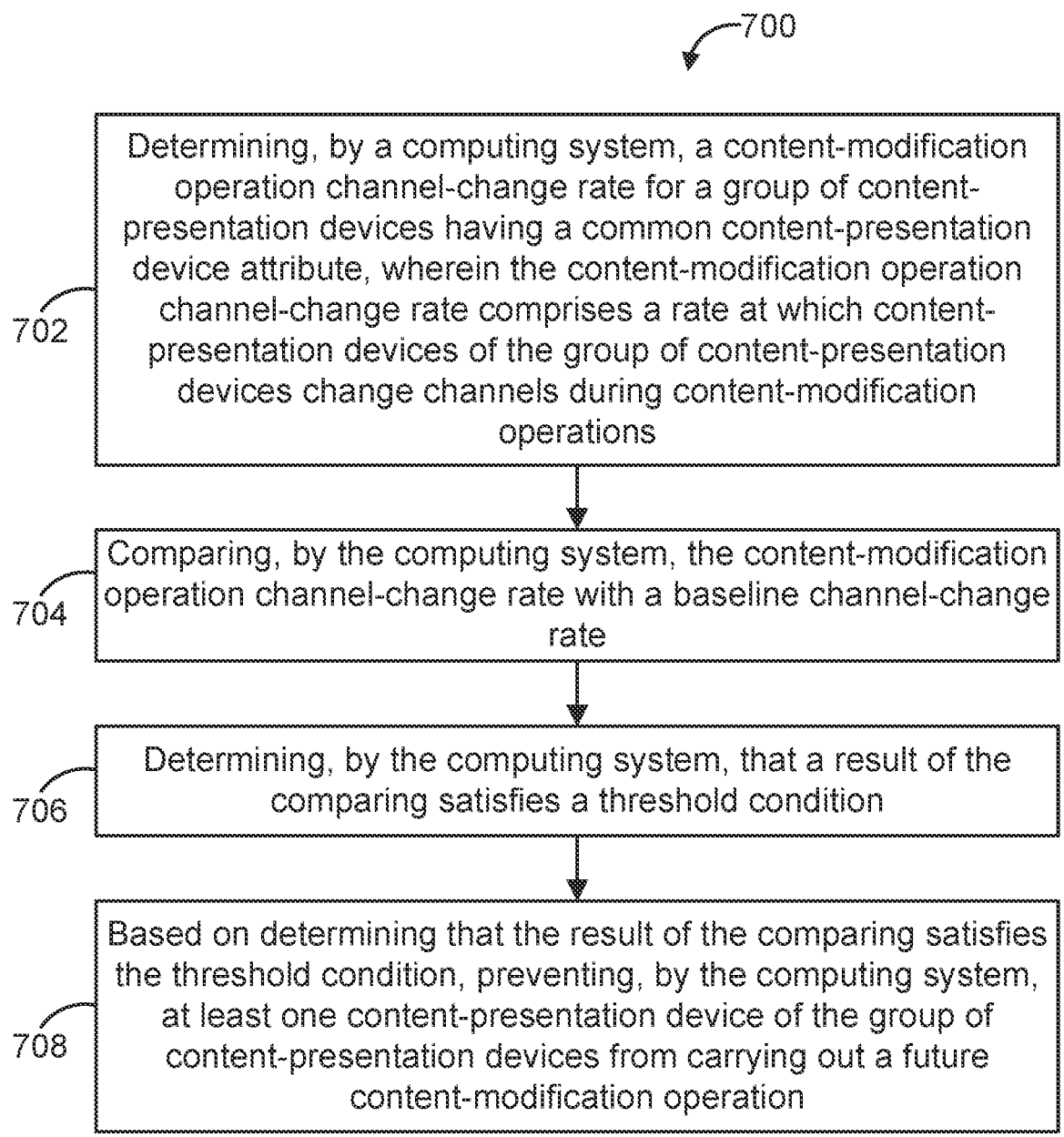
FIG. 7 is a flow chart of an example method.

FIG. 7 is a flow chart of an example method 700. Method 700 can be carried out by a computing system, such as computing system 200 of FIG. 2. At block 702, method 700 includes determining, by a computing system, a content-modification operation channel-change rate for a group of content-presentation devices having a common content-presentation device attribute. The content-modification operation channel-change rate is a rate at which content-presentation devices of the group of content-presentation devices change channels during content-modification operations. At block 704, method 700 includes comparing, by the computing system, the content-modification operation channel-change rate with a baseline channel-change rate. At block 706, method 700 includes determining, by the computing system, that a result of the comparing satisfies a threshold condition. And at block 708, method 700 includes based on determining that the result of the comparing satisfies the threshold condition, preventing, by the computing system, at least one content-presentation device of the group of content-presentation devices from carrying out a future content-modification operation.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   determining, by a computing system, a content-modification operation channel-change rate between a number of content-modification operations during which one or more content-presentation devices of a group of content-presentation devices change channels and a number of the content-modification operations executed by the group of content-presentation devices, wherein the content-modification operations comprise presenting replacement content segments in place of modifiable content segments;
   comparing, by the computing system, the content-modification operation channel-change rate with a baseline channel-change rate; and
   in response to determining that a result of the comparing satisfies a threshold condition, preventing, by the computing system, at least one content-presentation device of the group of content-presentation devices from carrying out a future content-modification operation.

2. The method of claim 1, further comprising:
   detecting, by the computing system, a channel-change by a content-presentation device of the group of content-presentation devices during a content-modification operation; and
   based on the detecting, updating the content-modification operation channel-change rate.

3. The method of claim 1, wherein the baseline channel-change rate comprises a rate at which the one or more content-presentation devices of the group of content-presentation devices change channels while advertisements that are not part of a content-modification operation are presented.

4. The method of claim 1, wherein:
   the content-modification operation channel-change rate is a rate at which the one or more content-presentation devices of the group of content-presentation devices change channels during the content-modification operations on a given channel, and
   the baseline channel-change rate is a baseline channel-change rate for the given channel.

5. The method of claim 1, wherein:
   the content-modification operation channel-change rate is a rate at which the one or more content- presentation devices of the group of content-presentation devices change channels during the content-modification operations during a given daypart, and
   the baseline channel-change rate is a baseline channel-change rate for the given daypart.

6. The method of claim 1, wherein the baseline channel-change rate comprises an average content-modification operation channel-change rate for a global set of content-presentation devices that includes the group of content-presentation devices and at least one other group of content-presentation devices.

7. The method of claim 1, wherein the group of content-presentation devices have a common content-presentation device attribute that comprises a combination of a model number and a software version.

8. The method of claim 1, wherein:
a common content-presentation device attribute of the group of content-presentation devices comprises a combination of a model number, a software version, and a content-presentation device setup, and
the content-presentation device setup comprises a model number of another device coupled to the content-presentation devices of the group of content-presentation devices.

9. The method of claim 1, wherein determining that the result of the comparing satisfies the threshold condition comprises:
determining that the content-modification operation channel-change rate is greater than the baseline channel-change rate by a threshold amount.

10. The method of claim 1, further comprising based on the determining that the result of the comparing satisfies the threshold condition, reporting a common content-presentation device attribute of the group of content-presentation devices to a testing module.

11. The method of claim 1, further comprising storing, by the computing system, a common content-presentation device attribute of the group of content-presentation devices in a blacklist file,
wherein preventing at least one content-presentation device from carrying out a future content-modification operation comprises:
identifying by the computing system, at least one content-presentation device having the common content-presentation device attribute; and
based on identifying the at least one content-presentation device, preventing, by the computing system, the at least one content-presentation device from carrying out a future content-modification operation.

12. The method of claim 1, wherein the computing system is a content-modification system that provides supplemental content to the group of content-presentation devices for use in content-modification operations.

13. A computing system comprising:
a processor; and
a non-transitory computer-readable storage medium, having stored thereon program instructions that, upon execution by the processor, cause performance of a set of operations comprising:
determining a content-modification operation channel-change rate between a number of content-modification operations during which one or more content-presentation devices of a group of content-presentation devices change channels and a number of the content-modification operations executed by the group of content-presentation devices, wherein the content-modification operations comprise presenting replacement content segments in place of modifiable content segments;
comparing the content-modification operation channel-change rate with a baseline channel-change rate; and
in response to determining that a result of the comparing satisfies a threshold condition, preventing at least one content-presentation device of the group of content-presentation devices from carrying out a future content-modification operation.

14. The computing system of claim 13, wherein the set of operations further comprises:

detecting, by the computing system, a channel-change by a content-presentation device of the group of content-presentation devices during a content-modification operation; and
based on the detecting, updating the content-modification operation channel-change rate.

15. The computing system of claim 13, wherein the baseline channel-change rate comprises a rate at which the one or more content-presentation devices of the group of content-presentation devices change channels while advertisements that are not part of a content-modification operation are presented.

16. The computing system of claim 13, wherein:
the content-modification operation channel-change rate is a rate at which the one or more content-presentation devices of the group of content-presentation devices change channels during the content-modification operations on a given channel, and
the baseline channel-change rate is a baseline channel-change rate for the given channel.

17. The computing system of claim 13, wherein:
the content-modification operation channel-change rate is a rate at which the one or more content- presentation devices of the group of content-presentation devices change channels during the content-modification operations during a given daypart, and
the baseline channel-change rate is a baseline channel-change rate for the given daypart.

18. The computing system of claim 13, wherein the baseline channel-change rate comprises an average content-modification operation channel-change rate for a global set of content-presentation devices that includes the group of content-presentation devices and at least one other group of content-presentation devices.

19. The computing system of claim 13, wherein the group of content presentation device have a common content-presentation device attribute that comprises a combination of a model number and a software version.

20. A non-transitory computer-readable storage medium, having stored thereon program instructions that, upon execution by a processor, cause performance of a set of operations comprising:
determining a content-modification operation channel-change rate between a number of content-modification operations during which one or more content-presentation devices of a group of content-presentation devices change channels and a number of the content-modification operations executed by the group of content-presentation devices, wherein the content-modification operations comprise presenting replacement content segments in place of modifiable content segments;
comparing the content-modification operation channel-change rate with a baseline channel-change rate; and
based on determining that the result of the comparing satisfies a threshold condition, preventing at least one content-presentation device of the group of content-presentation devices from carrying out a future content-modification operation.

* * * * *